US011746259B2

(12) United States Patent
Park et al.

(10) Patent No.: US 11,746,259 B2
(45) Date of Patent: Sep. 5, 2023

(54) OPTICAL MODULE AND METHOD FOR MANUFACTURING THE SAME

(71) Applicant: OPROCESSOR INC, Boston, MA (US)

(72) Inventors: Sahnggi Park, Boston, MA (US); Kyungeun Kim, Boston, MA (US)

(73) Assignee: OPROCESSOR INC, Boston, MA (US)

( * ) Notice: Subject to any disclaimer, the term of this patent is extended or adjusted under 35 U.S.C. 154(b) by 605 days.

(21) Appl. No.: 16/739,736

(22) Filed: Jan. 10, 2020

(65) Prior Publication Data
US 2021/0214580 A1 Jul. 15, 2021

(51) Int. Cl.
*C09J 5/04* (2006.01)
*G02B 6/42* (2006.01)
(Continued)

(52) U.S. Cl.
CPC .................. *C09J 5/04* (2013.01); *B32B 37/12* (2013.01); *B32B 37/1284* (2013.01);
(Continued)

(58) Field of Classification Search
CPC .... C09J 5/04; C09J 2479/08; C09J 2203/318; C09J 5/00; C09J 177/00; C09J 179/08; C09J 2203/326; B32B 37/12; B32B 37/1284; B32B 37/10; B32B 2038/0076; B32B 2551/00; G02B 6/4214; G02B 6/4239; G02B 6/4206; G02B 6/122; G02B 2006/12114; G02B 2006/12166
See application file for complete search history.

(56) References Cited

U.S. PATENT DOCUMENTS 4,065,345 A 12/1977 Progar et al.
4,543,295 A 9/1985 Clair et al.
(Continued)

FOREIGN PATENT DOCUMENTS

JP H08-34856 * 2/1996
JP H08292307 A 11/1996
(Continued)

OTHER PUBLICATIONS

Dupont, MSDS for PI2723 Polyimide Coating, Apr. 1992. (Year: 1992).*
(Continued)

*Primary Examiner* — Christopher W Raimund
(74) *Attorney, Agent, or Firm* — Rabin & Berdo, P.C.

(57) ABSTRACT

According to embodiments, a method for manufacturing an optical module may include: applying a polyamic acid solution to an upper surface of a substrate structure to form an adhesive layer; forming an active functional group on an upper surface of the adhesive layer; applying a polyamic acid solution to a first surface of a prism to form a prism adhesive layer; forming a polyamic acid layer on at least one of a planarized upper surface of the adhesive layer and a lower surface of the prism adhesive layer; disposing the prism on the substrate structure such that the polyamic acid layer contacts the adhesive layer and the prism adhesive layer; and applying pressure to the prism and the substrate structure to bond the adhesive layer to the prism adhesive layer.

8 Claims, 11 Drawing Sheets

(51) Int. Cl.
  *B32B 37/12* (2006.01)
  *B32B 37/10* (2006.01)
  *B32B 38/00* (2006.01)
(52) U.S. Cl.
  CPC ............ *G02B 6/4214* (2013.01); *B32B 37/10* (2013.01); *B32B 2038/0076* (2013.01); *B32B 2551/00* (2013.01); *C09J 2479/08* (2013.01)

(56) References Cited

U.S. PATENT DOCUMENTS

| | | | |
|---|---|---|---|
| 4,795,798 | A | 1/1989 | Tamai et al. |
| 4,931,531 | A | 6/1990 | Tamai et al. |
| 4,932,743 | A * | 6/1990 | Isobe .................. G02B 6/34 385/36 |
| 6,198,159 | B1 | 3/2001 | Hosoma et al. |
| 6,307,008 | B1 | 10/2001 | Lee et al. |
| 2007/0260036 | A1 | 11/2007 | Kaneshiro et al. |
| 2008/0226902 | A1 * | 9/2008 | Giannantonio ....... H01L 51/525 428/524 |

FOREIGN PATENT DOCUMENTS

| | | |
|---|---|---|
| JP | H10275752 A | 10/1998 |
| JP | 2001033604 A | 2/2001 |
| JP | 2008162191 A | 7/2008 |
| JP | 2010160347 A | 7/2010 |
| JP | 2010235641 A | 10/2010 |
| KR | 1020170090593 A | 8/2017 |

OTHER PUBLICATIONS

Bo-in Noh et al., "Effect of Cr Thickness on Adhesion Strength of Cu/Cr/Polyimide Flexible Copper Clad Laminate Fabricated by Roll-to-Roll Process", Materials Transactions, vol. 51, No. 1, pp. 85-89, 2010.

Chang-Hwon Choi et al., "Colorless and Transparent Polyimide Films for Flexible Displays," Polymer Science and Technology, vol. 23, No. 3, pp. 296-306, 2012.

Hari Parvatareddy, "Durability of Polyimide Adhesives and Their Bonded Joints for High Temperature Applications", Dissertation submitted to the Faculty of the Virginia Polytechnic Institute and State University, Nov. 1997.

Ian K. Glasgow et al., "Design Rules for Polyimide Solvent Bonding," Sensors and Materials, vol. 11, No. 5, pp. 269-278, 1999.

K. Zoschke et al., "Polyimide Based Temporary Wafer Bonding Technology for High Temperature Compliant TSV Backside Processing and Thin Device Handling", Published in the SUSS report, Feb. 2012.

T Goettsche et al., "Development of highly precise bonding procedures for structured polyimide films on silicon substrates", Proc, on 4M Conf., pp. 1-4, 2003.

X.M. Zhang et al., "Preparation and properties of heat-sealable polyimide films with comparable coefficient of thermal expansion and good adhesion to copper matrix", eXPRESS Polymer Letters, vol. 11, No. 12 pp. 983-990, 2017.

Yun Jun Park et al., "Effect of Diamine compositon on Thermo-Mechanical properties and moisture absorption of polyimide films", Polymer(Korea), vol. 36, No. 3, pp. 275-280, 2012.

* cited by examiner

OPTICAL MODULE AND METHOD FOR MANUFACTURING THE SAME

BACKGROUND

The present disclosure herein relates to an adhesive structure and a method for manufacturing the same, and more particularly, to an optical module formed using an adhesive structure including a refractive index-matching adhesive layer.

A refractive index-matching oil is used for an optical module to measure an optical phenomenon. A material used for an optical module is required to have durability and strength at a high temperature. However, an adhesive or an adhesive film other than oil may not be suitable for an optical module due to their low refractive index. Also, an issue is raised that the adhesive or adhesive film exhibits a decrease in strength at a high temperature.

In the 1960s, Dupont developed a thermosetting polyimide. Afterwards, Dupont, NASA, and Mitsui Toatsu Chemicals developed a thermoplastic polyimide. Polyimide, however, is generally non-transparent, and thus has a limitation in application to an optical device or an optical package.

SUMMARY

The present disclosure provides a method for forming an adhesive structure by using an adhesive layer with improved adhesive strength and high transparency.

The present disclosure also provides an adhesive structure with less optical signal loss and a method for manufacturing the same.

The present disclosure relates to an optical module and a method for manufacturing the same. A method for manufacturing an optical structure according to the inventive concept include: preparing a substrate structure; applying a polyamic acid solution to an upper surface of the substrate structure to form an adhesive layer; planarizing the adhesive layer to form an active functional group on an upper surface of the adhesive layer; applying a polyamic acid solution to a first surface of a prism to form a prism adhesive layer; forming a polyamic acid layer on at least one of the planarized upper surface of the adhesive layer and a lower surface of the prism adhesive layer wherein the polyamic acid layer is in a liquid state; disposing the prism on the substrate structure such that the polyamic acid layer contacts the adhesive layer and the prism adhesive layer, and applying pressure to the prism and the substrate structure to bond the adhesive layer to the prism adhesive layer.

In an embodiment, the applying of pressure to the prism and the substrate structure may be performed at a temperature lower than a curing temperature of the polyamic acid layer.

In an embodiment, the applying of pressure to the prism and the substrate structure may be performed at a temperature ranging from 80° C. to 150° C.

In an embodiment, the prism adhesive layer may include the same polyimide as the adhesive layer.

In an embodiment, the polyamic acid layer may include the same material as the polyamic acid solution.

In an embodiment, the bonding of the adhesive layer to the prism adhesive layer may include forming intermolecular van der Waals force, an electric dipole bond or an induced dipole bond between a polyamic acid included in the polyamic acid layer and the active functional group.

In an embodiment, the active functional group may include a dangling bond.

In an embodiment, the bonding of the adhesive layer to the prism adhesive layer may include forming an ionic bond, a covalent bond or a metallic bond between a polyamic acid included in the polyamic acid layer and the active functional group.

In an embodiment, the bonding of the adhesive layer to the prism adhesive layer may include infiltrating a polyamic acid included in the polyamic acid layer into the adhesive layer or the prism adhesive layer, and solidifying the infiltrated polyamic acid.

In an embodiment, the substrate structure may include an optical waveguide, the optical waveguide may have a refractive index of 1.5 to 20, the adhesive structure may have a refractive index of 1.55 to 2.0, and the prism may have a greater refractive index than the optical waveguide.

In an embodiment, the forming of the adhesive layer may include:
spin-coating the polyamic acid solution on a surface of the substrate structure to form a first preliminary adhesive layer; conducting curing on a surface of the first preliminary adhesive layer to form a first adhesive layer; and the first adhesive layer may include a polyimide.

In an embodiment, the forming of the adhesive layer may include:
forming a second preliminary adhesive layer on the first adhesive layer; and carrying out curing on a surface of the second preliminary adhesive layer to form the second adhesive layer, wherein the second preliminary adhesive layer may include a polyamic acid, and the second adhesive layer may include a polyimide.

In an embodiment, the preparing of the substrate structure may include stacking a lower clad layer, an optical waveguide, and an upper clad layer on a substrate.

In other embodiments of the inventive concept, an optical module includes: a substrate structure including a substrate, a lower clad layer, an optical waveguide layer, and an upper clad layer which are stacked; a prism having a first surface and an inclined surface; and an adhesive structure provided between the substrate structure and the first surface of the prism and having a refractive index of 1.55 to 2.00, wherein the adhesive structure includes: an adhesive layer provided on the optical waveguide and the upper surface of the clad layer and having a polyimide; and a prism adhesive layer provided on the first surface of the prism and containing the same polyimide as the adhesive layer, wherein at least one of a chemical bond and intermolecular interaction is formed between the adhesive layer and the prism adhesive layer.

In an embodiment, the polyimide may include at least one among trifluoromethyl ($-CF_3$), sulfone ($-SO_2$) and/or ether ($-O-$) groups.

In an embodiment, the optical waveguide layer may have a refractive index of 1.5 to 2.0 and the prism has a greater refractive index than the optical waveguide layer.

In an embodiment, the adhesive structure may include a polymerization unit derived from an aromatic dianhydride monomer and a polymerization unit derived from a monomer including diamine group.

In an embodiment, transmittance of 500 nm to 2000 nm light to the adhesive structure with a thickness of 1 μm may be 95% to 100%.

In an embodiment, the intermolecular interaction may include van der Waals force, an electric dipole bond, or an induced dipole bond, and the chemical bond includes an ionic bond, a covalent bond or a metallic bond.

In an embodiment, voids and bubbles may not be formed between the adhesive layer and the prism adhesive layer.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Figure 1:
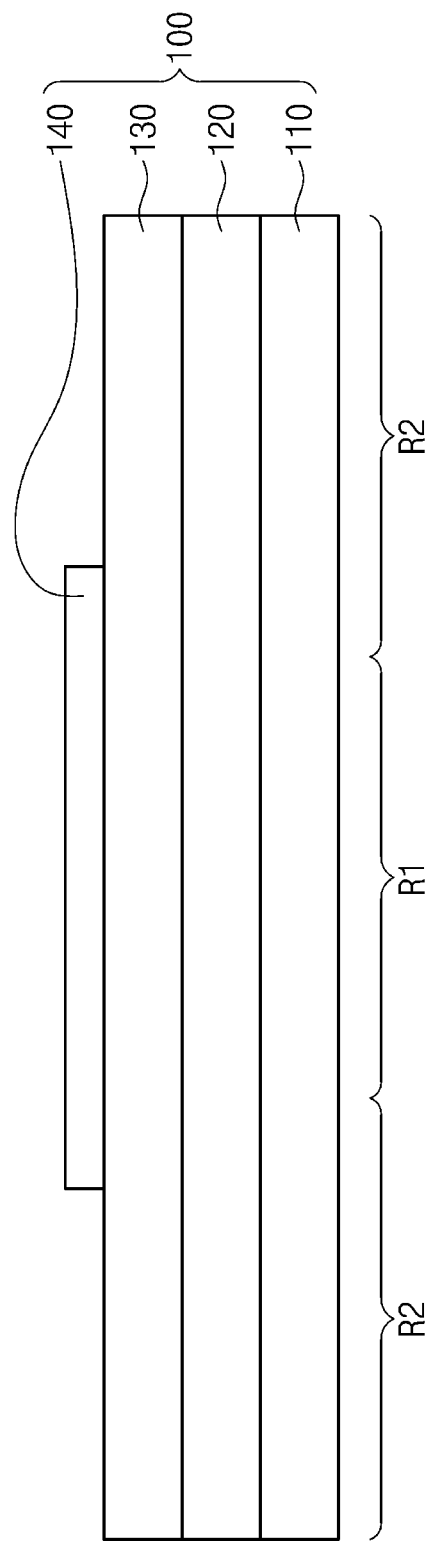
FIGS. 1 through 11 are a flowchart showing a method for manufacturing an optical module according to an embodiment.

Exemplary embodiments of the inventive concept will be described below in more detail with reference to the accompanying drawings for a sufficient understanding of the configuration and effect of the inventive concept. The inventive concept, however, should not be construed as limited to the embodiments set forth herein. Rather, the inventive concept may be embodied in different forms and variously modified. These embodiments are given to provide complete disclosure of the inventive concept and to fully convey the scope of the inventive concept to those skilled in the art. Those skilled in the art will appreciate that the inventive concept may be carried out in a certain suitable environment.

Terms used in the specification are only for explaining embodiments, not for limiting the inventive concept. The terms of a singular form include plural forms unless referred to the contrary. As used herein, the terms of a singular form may include plural forms unless the context clearly indicates otherwise. It will be further understood that the terms "include," "comprises" and/or "including," "comprising," when used in this specification, specify the presence of stated features, steps, operations, and/or elements, but do not preclude the presence or addition of one or more other features, steps, operations, and/or elements.

In the specification, when a film (or layer) is referred to as being on another film (or layer) or substrate, it may be directly on the other film or substrate, or intervening a third film (or layer) may be present.

Although the terms such as first, second, third, etc. are used herein to describe various regions, films (or layers) and the like, these regions, films (or layers), and the like should not be limited by these terms. These terms are used only to distinguish one region or film (or layer) from another region or film (or layer). Therefore, a film material referred to as a first film material in one embodiment may be referred to as a second film material in another embodiment. An embodiment described and exemplified herein includes a complementary embodiment thereof.

Unless otherwise defined, the terms used in embodiments of the inventive concept may be interpreted as meaning commonly known to those skilled in the art.

In the chemical formula of the specification, unless a specific definition is otherwise provided, a hydrogen atom is bonded at the position when a chemical bond is not drawn where supposed to be given.

Like reference numerals refer to like elements throughout.

Hereinafter, an adhesive and a method for manufacturing the same according to embodiments will be described.

An adhesive according to the inventive concept may be an adhesive material and/or an adhesive composition. The adhesive may be used to form an adhesive layer which will be described later. The adhesive may have a relatively high glass transition temperature. The adhesive may have a refractive index of about 1.55 to about 2.0. The adhesive may have solvent resistance. The solvent resistance may refer to low reactivity or no reactivity with a solvent. The solvent, for example, may include acetone and/or methanol. Accordingly, the adhesive may be readily applied to a process for manufacturing a semiconductor device, an optical device, and an optical module. For instance, the adhesive may not be damaged by the solvent during the cleaning process for a semiconductor device, an optical device and an optical module. The adhesive may have a high transmittance. A film with a thickness of 1 μm prepared using the adhesive layer may have a transmittance of 95 to 100% for 500 to 2000 nm light. A film with a thickness of 100 μm prepared using the adhesive may have a transmittance of 90 to 100% for 500 to 2000 nm light.

The adhesive may include a polyamic acid and/or derivatives thereof. The polyamic acid and derivatives thereof may include an aromatic ring. The aromatic ring may include, for example, a benzene or cycloolefin structure. The polyamic acid and derivatives thereof may include a high electronegative element or a high electronegative group. The high electronegative element/group may be included in the main chain of the adhesive. The high electronegative element/group may include at least one among trifluoromethyl ($-CF_3$), sulfone ($-SO_2$) and/or ether ($-O-$) groups. Accordingly, a polyimide prepared using the polyamic acid may have a high transmittance for a certain wavelength. Hereinafter, the specification defines that a polyamic acid includes a polyamic acid and derivatives thereof. A polyimide is defined as one having a polyimide and derivatives thereof.

The polyamic acid according to embodiments may include a polymerization unit derived from an aromatic dianhydride monomer and a polymerization unit derived from a monomer including a diamine group. The polymerization unit derived from a monomer including a diamine group may be bonded to the polymerization unit derived from an aromatic dianhydride monomer. At least one of the aromatic dianhydride monomer and the monomer including a diamine group may include a high electronegative element/group. The dianhydride monomer may include ODPA (4,4'-Oxydiphthalic anhydride), PMDA (Pyromellitic dianhydride), DSDA (3,3',4,4'-Diphenylsulfone tetracarboxylic dianhydride), BPDA (3,3',4,4'-Biphenyltetracarboxylic dianhydride), BPADA (4,4'-Bisphenol A dianhydride), 6FDA (2,2'-Bis-(3,4-Dicarboxyphenyl) hexafluoropropane dianhydride), BTDA (3,3',4,4'-Benzophenone tetracarboxylic dianhydride), CHDA (1,4-Cyclohexanedicarboxylic acid) and/or derivatives thereof. The aromatic dianhydride monomer, for example, may include at least one of the materials shown in formula 1 below.

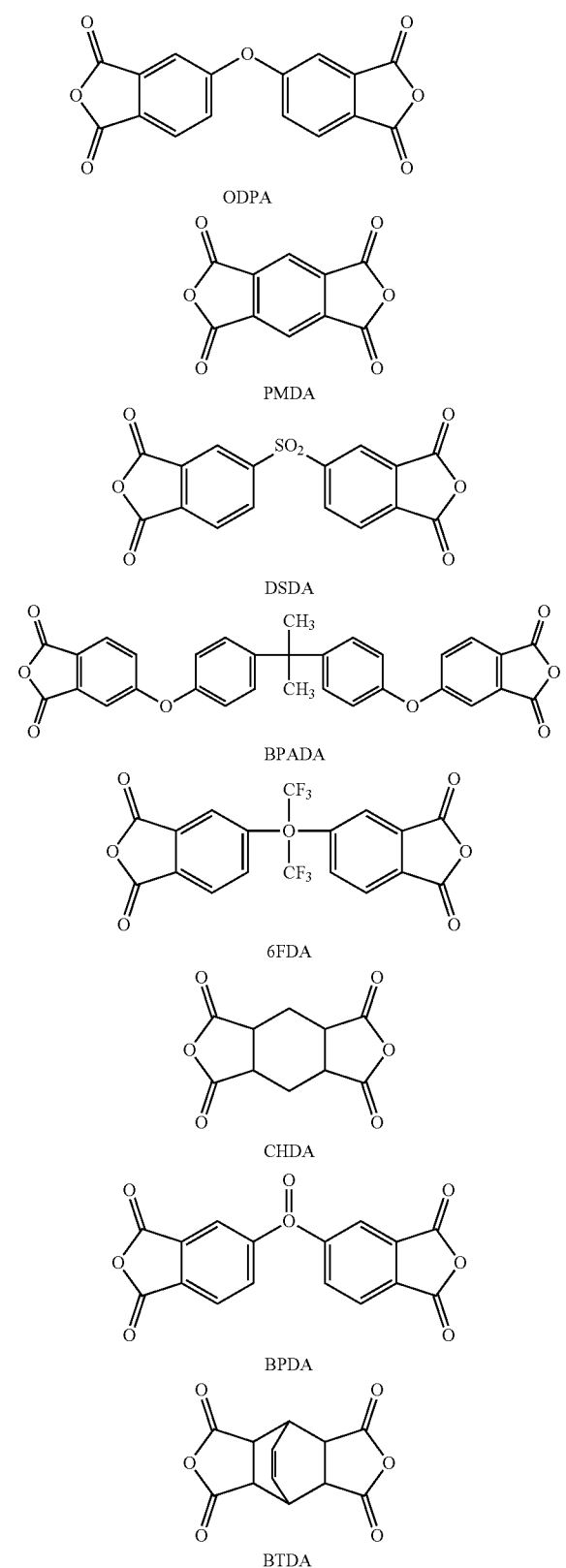

[Formula 1]

ODPA, PMDA, DSDA, BPADA, 6FDA, CHDA, BPDA, BTDA

The monomer including a diamine group, for example, may include, TFB (2,2'-Bis(trifluoromethyl)benzidine), m-XDA (m-Xylylenediamine), 3,4'-ODA (3,4'-Oxydianiline), 4,4'-ODA (4,4'-Oxydianiline), m-BAPS (2,2-Bis [4-(3-aminophenoxy) benzene], BAPB (4,4'-Bis (4-aminophenoxy) biphenyl), BAPP (2,2-Bis [4-(4-aminophenoxy) phenyl] propane) and/or derivatives thereof. The monomer including a diamine group may include at least one of the materials shown in formula 2 below.

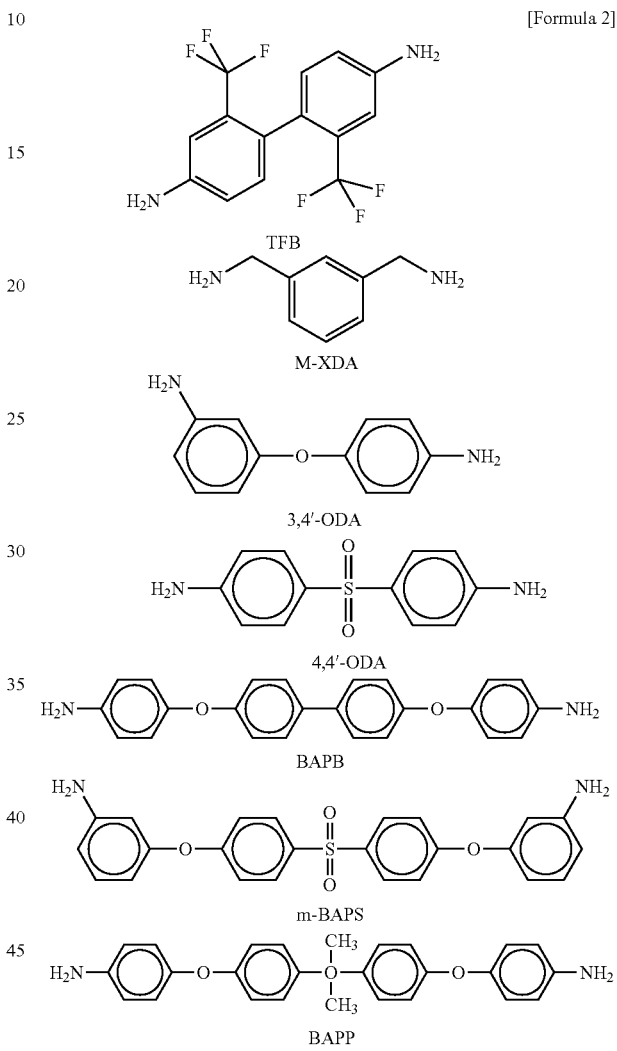

[Formula 2]

TFB, M-XDA, 3,4'-ODA, 4,4'-ODA, BAPB, m-BAPS, BAPP

Producing the adhesive layer may include preparing an adhesive including a polyamic acid (PAA) and synthesizing a polyimide by an imidization process of the polyamic acid.

The polyamic acid may be prepared by the reaction of an aromatic dianhydride monomer and a monomer including a diamine group. For example, the aromatic dianhydride monomer and the monomer including a diamine group are added to a first solvent to prepare a reaction solution. The first solvent, for instance, may include DMAc (N,N-dimethylacetamide), DMF (dimethylforamide), NMP (N-methyl-1-2-pyrollidone), and/or m-cresol. The reaction solution is reacted under a nitrogen atmosphere for 5 to 24 hours to prepare a polyamic acid solution. The polyamic acid solution, for example, may include 10-30 wt % of an intermediate product and 70-90 wt % of a residual solvent. The intermediate product is a solid material dissolved in the residual solvent and may be an extract resulted from reaction. The intermediate product may include a polyamic acid. The residual solvent may include the same material as the first solvent.

The polyamic acid imidization process according to an embodiment may be performed by a thermal imidization process. The thermal imidization process may include heating the polyamic acid at 200° C. to 350° C. The polyamic acid may include a plurality of polyamic acid molecules. An intermolecular bonding between the polyamic acid molecules may be formed by the imidization process, resulting in vitrification of the polyamic acid. A chain structure among a plurality of polyamic acid molecules may be formed by the intermolecular bonding. Subsequently, a polyimide is prepared. At least some of the residual solvent may be evaporated during the thermal imidization process. For example, volatile materials and water in the residual solvent may be evaporated.

When the polyamic acid is heated at a temperature lower than glass transition temperature (Tg), the polyamic acid may be dried. The temperature lower than the glass transition temperature of the polyamic acid herein may be 80° C. to 150° C. In this case, the product may have a low strength. For example, when the product is pressed by a nail, the shape of the product may be deformed.

The thermal imidization process of the polyamic acid according to embodiments may be performed at a temperature higher than the glass transition temperature. Accordingly, the polyamic acid is cured so that a polyimide, as a final product, may have a high strength. The strength of the final product, for example, may be the same or similar to the strength of steel. Therefore, a grinding or a polishing process may be performed on a film prepared from the polyimide. Applicability of a polyimide film may be improved.

The polyamic acid imidization process according to embodiments may be performed by a chemical imidization process. The chemical imidization process may include using a dehydration catalyst to remove water included in the polyamic acid and heating the polyamic acid at a high temperature thereafter. The dehydration catalyst may include acetic anhydride and/or pyridine. A polyimide may be prepared by the chemical imidization process and the polyimide may have a high strength in a solid state. In the specification, unless otherwise defined, a high temperature may refer to a temperature of 200° C. or more, specifically, about 200° C. to 350° C.

A polyimide may be prepared by heating a polyamic acid at a high temperature (i.e. 200° C. to 350° C.). In general, the transmittance of a polyimide may be decrease due to a high temperature heat. After the high temperature heating process, for example, the polyimide may be in dark brown. This may be because during the high temperature heating process, π electrons in the cyclic chain structure of the polyimide are transferred to the resonance energy excitation band of the intermolecular bonds in the wavelength region of visible light due to a charge transfer complex phenomenon. the polyamic acid according to embodiments may include a high electronegative element/group. Accordingly, even if the polyamic acid is heated at a high temperature, π electron transfer may be decreasing and resonance may be reduced.

Hereinafter, an adhesive strength of an adhesive will be described.

When the adhesive includes organic materials such as an epoxy polymer, an acryl polymer and/or a polyimide, the adhesive strength of the adhesive may be described in four ways below.

Adhesive strength by electrostatic force: when an electric charge is generated on the surfaces of two subjects to be adhered, an electrostatic force is applied between the surfaces of the two subjects like a capacitor to have an adhesive strength. However, an adhesive strength ratio by the electrostatic force to a total adhesive strength may be quite small.

Mechanical interlocking: when the surfaces of two subjects to be adhered are rough and have particularly fine pores, a solution adhesive may be permeated into the pores and solidified. Accordingly, the two subjects to be adhered may be mechanically interlocked. The mechanical interlocking may have a high adhesive strength. When increasing the roughness on the surfaces of the two subjects to be adhered by the surface treatment process, the adhesive strength by the mechanical interlocking may increase.

Inter-diffusion: an adhesive strength by inter-diffusion is a kind of mechanical interlocking. Polymer adhesive in solution is diffused and permeated from the surface of a subject into an inner of the subject and the polymer adhesive is solidified to generate the adhesive strength. When the surface of a subject to be adhered is smooth, the adhesive strength by inter-diffusion may be generated.

Adsorption: adsorption is a most commonly applied adhesive mechanism. Primary forces may be generated by an ionic bond, a covalent bond and/or a metallic bond among atoms and molecules between two subjects to be adhered. In this case, the covalent bond of the primary force may be a valence covalent bond. Secondary forces may include van der Waals force, an atom/molecule covalent bond, an electric dipole bond, or an induced dipole bond, and/or bond from acid interaction. The covalent bond of the secondary forces may be a covalent bond among atoms, molecules, or between an atom and a molecule. When the distance between the two subjects to be adhered is 1 nm or more, the primary forces out of the total adsorption adhesive strength between the two subjects may not be significant. In other words, when the distance between the two subjects to be adhered is 1 nm or more, the adsorption adhesive strength between the two subjects may be an adhesive strength by the secondary forces. The adhesive strength by a chemical bond may be mostly an adhesive strength by the secondary forces.

When an adhesive includes organic materials such as an epoxy polymer, acryl polymer, and/or a polyimide, an adhesive strength by inter-diffusion from mechanical interlocking and/or an adhesive strength by secondary forces may bond an adhesive to a subject to be adhered.

Hereinafter, types of a polyimide and polyimide adhesion based on a type will be described.

A polyimide may be classified into a thermosetting polyimide and a thermoplastic polyimide by their thermal properties.

(1) Thermosetting Polymer

In general, when a thermosetting polyimide is once cured, the thermosetting polyimide has non-processability. For example, the form of the cured thermosetting polyimide may hardly change. In this case, curing of the thermosetting polyimide may be performed at a temperature higher than the glass transition temperature. When the thermosetting polyimide is cured, even if the temperature increases, the strength of the thermosetting polyimide may not change.

Adhesion of the thermosetting polyimide may be performed by using a polyamic acid solution or a polyimide film. For example, a polyamic acid solution may be prepared. A polyamic acid layer may be formed by coating the surface of a subject to be adhered with the polyamic acid solution. The polyamic acid layer may be dried for 1-2 hours at a temperature of 120° C. As another example, the polyimide layer after being dried may be provided between the subjects to be adhered. After the drying process, the polyimide film may include 3-5 wt % of solvent. The solvent may include volatile materials such as water. Pressure of 0.1-1 MPa may be applied to the subjects to be adhered and the polyimide film. Applying the pressure may be performed for more than an hour at a temperature of 300° C. under a nitrogen atmosphere. Accordingly, the polyimide film is cured and the subjects to be adhered may be bonded to the polyimide film. The principal element of an adhesive strength between the polyimide film and the subjects to be adhered may be the adhesive strength by inter-diffusion. The secondary element of the adhesive strength between the polyimide film and the subjects to be adhered may be the adhesive strength by a chemical bonding force. In this case, the solvent in the polyimide film may be evaporated during the curing process. Accordingly, voids may be generated between the polyimide film and the subjects or bubbles may be formed in the polyimide film. The adhesive strength of the polyimide film may decrease due to the voids and the bubbles. Also, the polyimide film may not be used for preparing flexible copper clad laminate due to the voids.

(2) Thermoplastic Polymer

When a cured thermoplastic polyimide is provided at a temperature higher than the curing temperature, the strength of the thermoplastic polyimide may decrease and the volume of the thermoplastic polyimide may expand. In addition, the cured thermoplastic polyimide may change into a flowing state from a solid state at a certain temperature higher than the curing temperature. Being in the flowing state may refer to a state in which the cured thermoplastic polyimide melts. For example, when the thermoplastic polyimide in the flowing state is compressed between two plates, the thermoplastic polyimide may flow out of the sides of the plates.

Adhesion of the thermoplastic polyimide may be performed by using a polyamic acid solution or a polyimide film. For example, the adhesion of the thermoplastic polyimide may be performed after the form of the thermoplastic polyimide changes at a temperature higher than the curing temperature of the thermoplastic polyimide or may be performed simultaneously while the form changes.

(3) Adhesive According to Embodiments

A refractive index of an adhesive according to embodiments of the inventive concept may have nothing to do with a temperature condition. For example, even if the temperature changes, the refractive index of the adhesive may have a constant value. Moreover, refractive index matching conditions for subjects to be adhered may be satisfied.

The adhesive may have a high mechanical, chemical resistance, and a high transmittance. A polyimide according to embodiments may be thermosetting or thermoplastic. A polyimide according to embodiments may include a thermosetting polyimide, satisfy the refractive index-matching conditions, and may have a high mechanical, chemical resistance, and a high transmittance. When a polyimide according to embodiments is a thermoplastic polyimide, the thermoplastic polyimide may have a significantly high glass transition temperature.

Grinding or polishing generally may not be performed on an adhesive made of organic materials. This is because frictional heat is generated on the surface during the grinding or polishing, resulting in putting the surface in a flowing state. Since a polyimide according to embodiments may have a high strength at a temperature of 400° C. or higher, planarization may be carried out on an adhesive layer. Planarization process may include grinding process or polishing process.

A broken link such as a dangling bond may be generated on the surface of the planarized polyimide layer. When a polyamic acid or a solvent is applied to the surface of a polyimide layer, a dangling bond and a polyamic acid may be chemically re-bonded.

Bonding forces between an adhesive and subjects to be adhered according to embodiments may include bonding forces by secondary forces and bonding forces by inter-diffusion, the bonding forces by the secondary forces may be stronger than the bonding forces by the inter-diffusion. An adhesive according to embodiments may have a stronger bonding force and better adhesive surface conditions at a second temperature condition than at a first temperature condition. The first temperature condition is the curing temperature of a thermosetting polyimide which is about 300° C. to about 350° C. The second temperature condition is a chemical reaction temperature which is about 80° C. to about 150° C.

Hereinafter, an adhesive structure, a method for preparing an adhesive structure, and a method for preparing an optical module according to embodiments of the inventive concept will be described. Duplicate content described above will be omitted.

FIGS. 1 to 11 show drawings to describe a method for preparing an optical module according to an embodiment. Hereinafter, duplicate content described above will be omitted.

Referring to FIG. 1, a substrate structure 100 may be prepared. The substrate structure 100 may include a substrate 110, a lower clad layer 120, an optical waveguide layer 130, and an upper clad layer 140 which are stacked. The substrate 110 may include a semiconductor material such as crystalline silicon. The substrate 110 may be a semiconductor wafer. The substrate 110, for example, may have a refractive index of about 3.45. The substrate 110 may have a first region R1 and a second regions R2 as viewed in a plain view. The first region R1 may be provided between the second regions R2.

The lower clad layer 120 may include a semiconductor oxide such as a silicon dioxide. The lower clad layer 120, for example, may have a refractive index of about 1.45. The lower clad layer 120 may be formed by a thermal oxidation process.

The optical waveguide layer 130 may be provided on the lower clad layer 120. The lower clad layer 120 may have a lower refractive index than the optical waveguide layer 130. The optical waveguide layer 130 may have a lower refractive index than the substrate 110. The optical waveguide layer 130 may include silicon nitride or silicon oxynitride. The silicon nitride may have a refractive index of about 2.0. The silicon oxynitride may have a refractive index of about 1.45-2.0. The optical waveguide layer 130 may have a refractive index of about 1.5-2.0.

The upper clad layer 140 may cover a portion of the upper surface of the optical waveguide layer 130. The upper clad layer 140, for example, may expose at least a portion of the upper surface of the optical waveguide layer 130 on the second regions R2 of the substrate 110 while covering the upper surface of the optical waveguide layer 130 on the first region R1 of the substrate 110.

The upper clad layer 140 may have a lower refractive index than the optical waveguide layer 130. The upper clad layer 140 may include semiconductor oxides such as a silicon dioxide. The upper clad layer 140 may have a refractive index of about 1.45. The upper clad layer 140 may be formed by a deposition process such as plasma vapor deposition.

Figure 2:
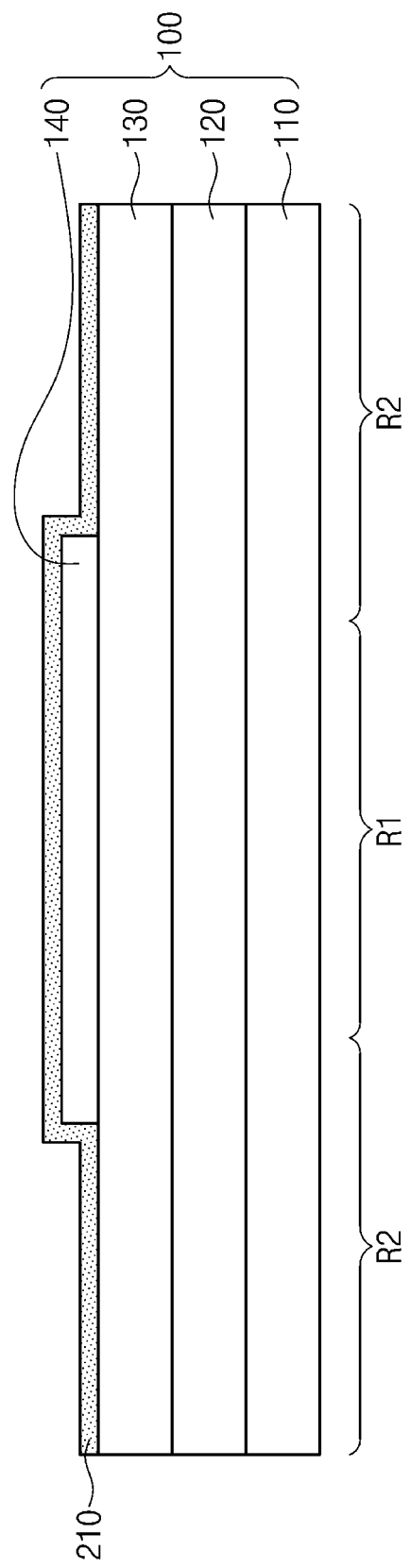

Referring to FIG. 2, an adhesive may be prepared. The adhesive may include the polyamic acid solution described above. The adhesive, for example, may include a polyamic acid and a solvent. The solvent may be the residual solvent described in the embodiment of preparing a polyamic acid solution. The solvent may include NMP (N-methyl-1-2-pyrollidone). As another example, the solvent may include DMAc (N,N-dimethylacetamide, DMF (dimethylforamide), and/or m-cresol. The characteristics of the adhesive are as described above.

A first adhesive layer 211 may be formed on the substrate structure 100 by using the adhesive. Forming the first adhesive layer 211 may include spin-coating the substrate structure 100 with the adhesive to form first preliminary adhesive layers and curing the first preliminary adhesive layers. The first preliminary adhesive layers may cover the optical waveguide layer 130 and the upper clad layer 140. The first preliminary adhesive layers may be formed with a thickness of about 1 µm to about 2 µm. The first preliminary adhesive layers may include a polyamic acid. The first adhesive layer 211 may be formed by performing a curing process on the first preliminary adhesive layers. The first adhesive layer 211 may include a polyimide. In other words, the polyamic acid may be cured to form the polyimide. The curing process may include a first process performed at a first temperature, a second process performed at a second temperature, and a third process performed at a third temperature. The first, second, and third process may be performed consecutively. The second temperature may be higher than the first temperature, and the third temperature may be higher than the second temperature. For example, the first temperature may be 120° C., the second temperature may be 250° C., and the third temperature may be 400° C. The rate of temperature increase may be 3-5° C./min. Each of the first, second, and third process may be performed for about 60 minutes. The curing process, as an example, may be performed in an oven of a nitrogen atmosphere. As another example, the curing process may be performed on an atmospheric hot plate. After the third process, the first adhesive layer 211 may be provided at room temperature (about 25° C.). In this case, the rate of temperature drop may be 5-8° C./min.

The first adhesive layer 211 may conformally cover the upper and side surfaces of the upper clad layer 140 and the exposed upper surface of the optical waveguide layer 130.

Figure 3:
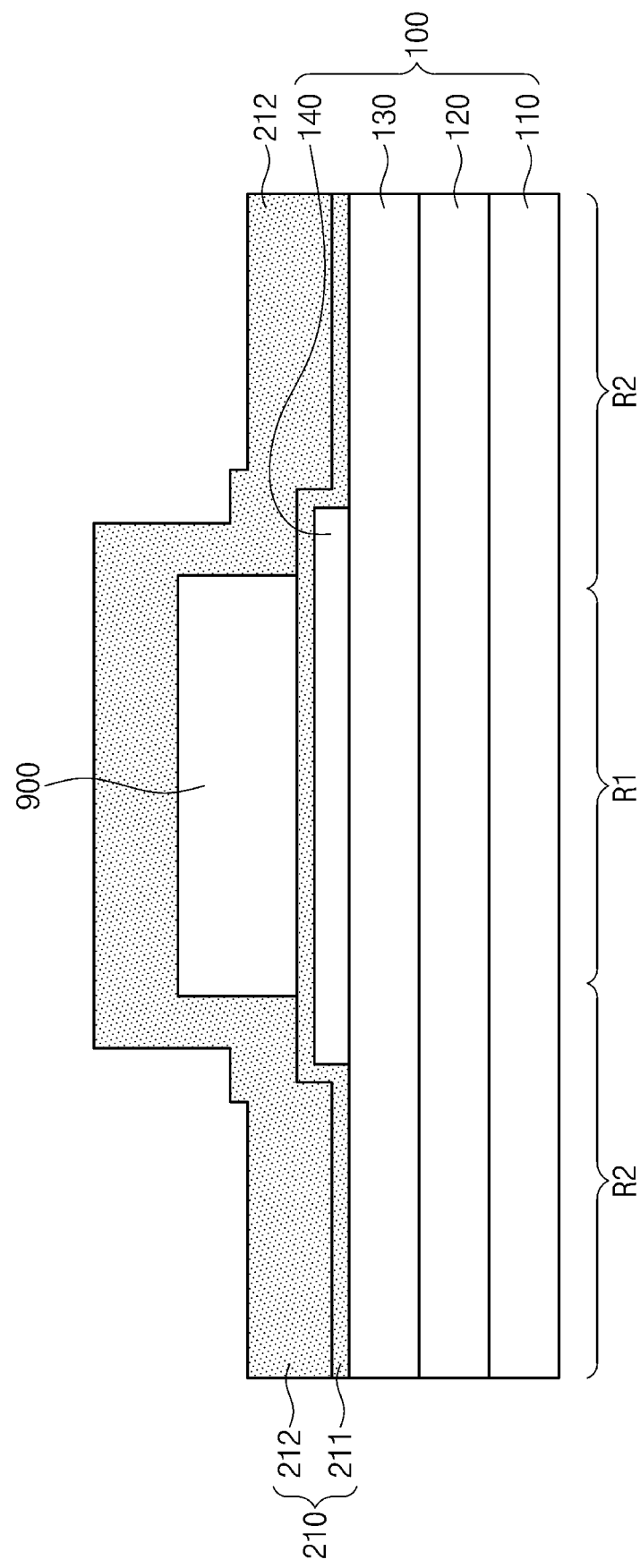

Referring to FIG. 3, second adhesive layers 212 may be formed on the first adhesive layer 211 to form an adhesive layer 210. According to embodiments, a mask pattern 900 may be formed on the first adhesive layer 211 before the second adhesive layers 212 are formed. The mask pattern 900 may expose the first adhesive layer 211 on the second regions R2 of the substrate 110 while covering the first adhesive layer 211 on the first region R1 of the substrate 110. The mask pattern 900 may include a photoresist material. For example, the photoresist material may include a negative photoresist material.

Forming the second adhesive layer 212 may include spin-coating the first adhesive layer 211 exposed by the mask pattern 900 with the adhesive to form second preliminary adhesive layers and curing the second preliminary adhesive layers. The adhesive may include the same polyamic acid solution as the adhesive used for forming the first adhesive layer 211. The second preliminary adhesive layers may include a polyamic acid. The spin-coating process may be repeated a plurality of times and each of the second preliminary adhesive layers may include a plurality of stacked layers. The spin-coating process may be performed till the second preliminary adhesive layers have a thickness of about 5 µm to about 15 µm.

The second preliminary adhesive layers may be cured to form second adhesive layers 212. Curing the second preliminary adhesive layers may be performed in the same way of curing the first preliminary adhesive layers described in FIG. 2. For example, the curing process may include a first process performed at a first temperature, a second process performed at a second temperature, and a third process performed at a third temperature. The first, second, and third process may be performed consecutively. The second temperature may be higher than the first temperature, and the third temperature may be higher than the second temperature. For example, the first temperature may be 120° C., the second temperature may be 250° C., and the third temperature may be 400° C. After the third process, the first adhesive layer 211 may be provided at room temperature (about 25° C.). A first drying process of the second preliminary adhesive layers and a removal process of the mask pattern 900 may be performed after the second process and before the third process. The removal process of the mask pattern 900 may be carried out by using a photoresist remover. The removal process of the mask pattern 900 may expose the first adhesive layer 211 on the first region R1 of the substrate 110. The sequence of the removal process of the mask pattern 900 may be variously modified. The polyamic acid may be cured by the curing process to form a polyimide. Therefore, the second adhesive layers 212 may include the polyimide. Specifically, the second adhesive layers 212 may include the same polyimide as the first adhesive layer 211. For example, the chemical structure and composition ratio of the polyimide of each of the second adhesive layers 212 may be same as the chemical structure and composition ratio of the polyimide of the first adhesive layer 211, respectively. Hereinafter, the "same polyimide" in the specification may indicate the polyimide substantially having the same chemical structure and composition ratio. The second adhesive layers 212 may be spaced apart from each other. The second adhesive layers 212 may be formed on the second regions R2 of the substrate 110 and cover the first adhesive layer 211.

The adhesive layer 210 may be prepared based on the embodiments described so far. The adhesive layer 210 may include the first adhesive layer 211 and the second adhesive layers 212 on the first adhesive layer 211. Although FIG. 3, FIG. 4, FIGS. 10 to 12, FIG. 13A, and FIG. 13B separately illustrate the first adhesive layer 211 and the second adhesive layers 212 for convenience of description, the interface between the first adhesive layer 211 and the second adhesive layers 212 may not be distinguished.

Figure 4:
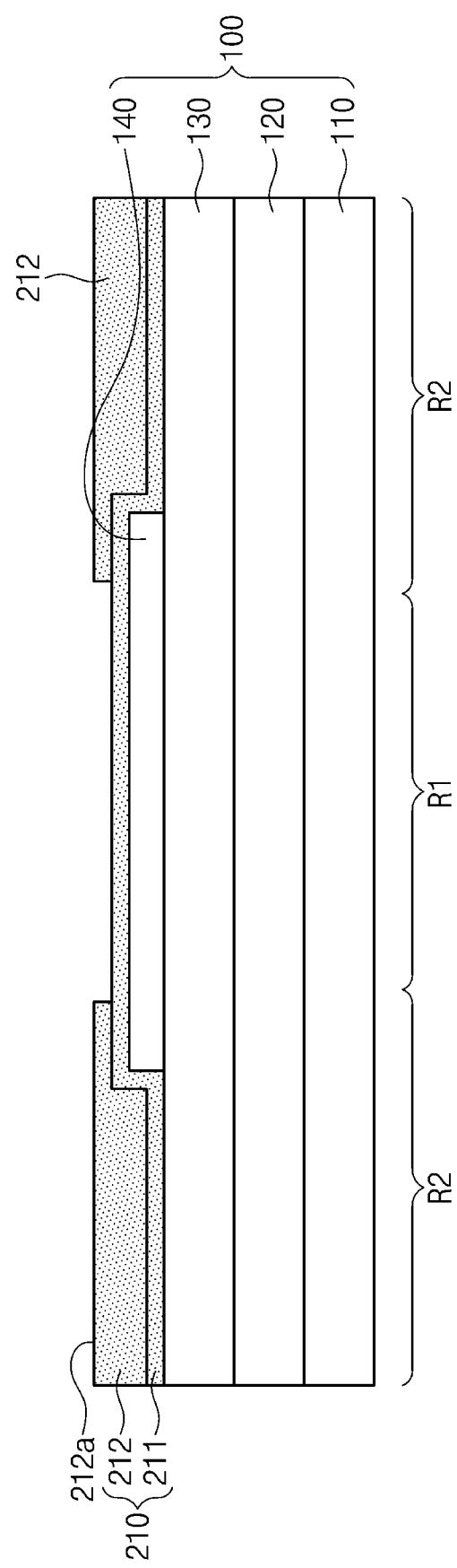

Referring to FIG. 4, a planarization process may be performed on the second adhesive layers 212 to form active functional groups. The planarization process may decrease the thickness of the second adhesive layers 212. The planarization process may include at least one of grinding and polishing processes. For example, the planarization process may include performing the grinding process till the second adhesive layer 212 has a thickness of about 3 µm to about 7 µm and then performing the polishing process till each of the second adhesive layer 212 has a thickness of about 1 µm to about 5 µm. As another example, the planarization process may include a chemical mechanical planarization (CMP) process. The planarization process, as another example, may be performed as the grinding process alone, or as the polishing process alone. The planarization may be confirmed by observing the reflection and transmission of light irradiated on the second adhesive layers 212.

Bonding in the polyimide molecules of the second adhesive layers 212 may be broken by the planarization process. Accordingly, the active functional groups may be formed on planarized upper surfaces 212a of the second adhesive layers 212. The active functional groups may include dangling bonds or radicals.

According to embodiments, as the first adhesive layer 211 is formed, the upper clad layer 140 and the optical waveguide layer 130 may be prevented from damaged from the planarization process of the second adhesive layers 212.

Figure 5:
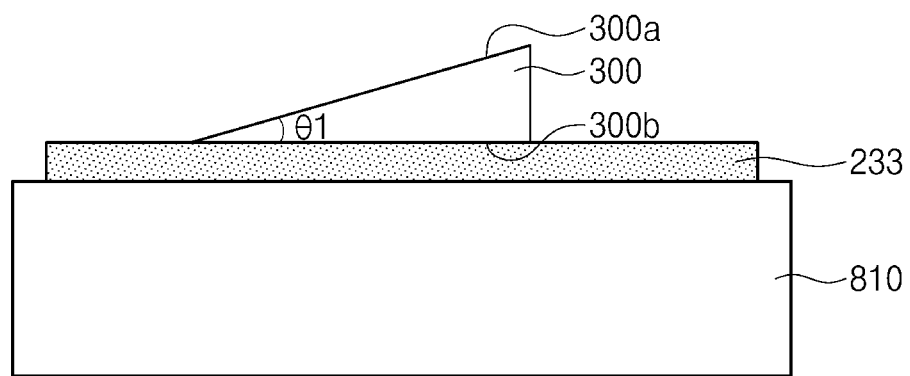

Referring to FIG. 5, an adhesive is applied to a first temporary substrate 810 to form a third preliminary adhesive layer 233. The first temporary substrate 810, for example, may include a slide glass. The adhesive may be the same as the polyamic acid solution described above. In other words, the third preliminary adhesive layer 233 may include the polyamic acid solution. The third preliminary adhesive layer 233 may have a thickness of about 1 to about 10 μm.

A prism 300 may be prepared. The prism 300 may have a first surface 300b and an inclined surface 300a. The first surface 300b of the prism 300 may be a lower surface of the prism 300. The angle θ1 between the first surface 300b and the inclined surface 300a of the prism 300 may be an acute angle. The prism 300 may include crystalline silicon or gallium phosphide (GaP). The gallium phosphide may have a refractive index of about 3.16. The prism 300 may have a greater refractive index than that of the optical waveguide layer 130 described in FIG. 1. Specifically, the prism 300 may have a greater refractive index than that of the core of the optical waveguide.

The prism 300 may be provided on the first temporary substrate 810 such that the first surface 300b of the prism 300 contacts the third preliminary adhesive layer 233.

Figure 6:
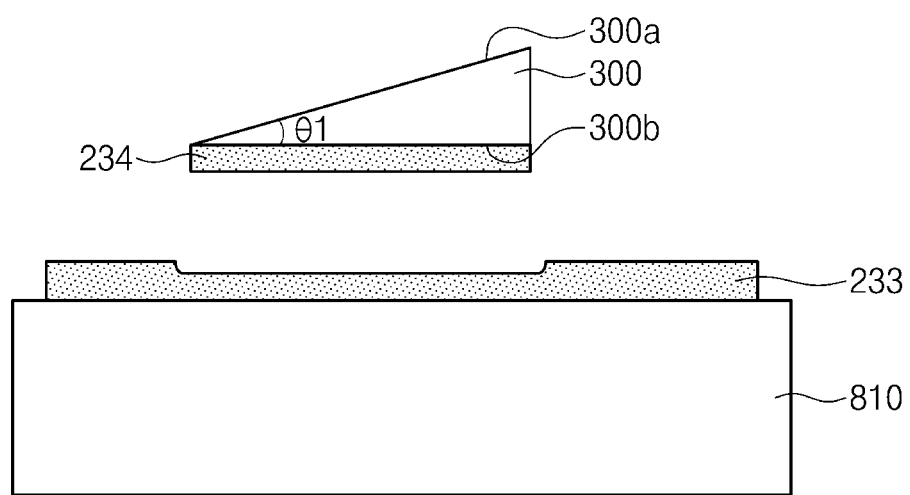

Referring to FIG. 6, since the third preliminary adhesive layer 233 is in a solution state, at least some portion of the third preliminary adhesive layer 233 may cover the first surface 300b of the prism 300. The prism 300 may be separated from the first temporary substrate 810. The at least some portion of the third preliminary adhesive layer 233 may be separated from the first temporary substrate 810 along with the prism 300 to form a fourth preliminary adhesive layer 234. The fourth preliminary adhesive layer 234 may cover the first surface 300b of the prism 300. Another portion of the third preliminary adhesive layer 233 may remain on the first temporary substrate 810.

Figure 7:
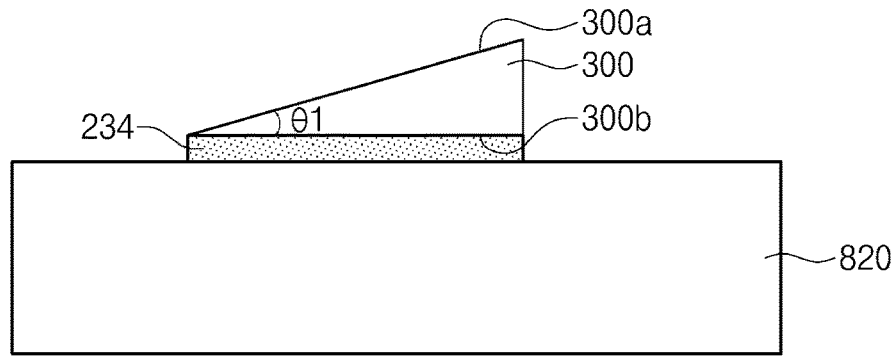

Referring to FIG. 7, a second temporary substrate 820 may be prepared. The second temporary substrate 820 may be, for example, a slide glass. The second temporary substrate 820 may be a substrate on which a polyamic acid is not applied.

The prism 300 may be provided on the second temporary substrate 820 such that the fourth preliminary adhesive layer 234 contacts an upper surface of the second temporary substrate 820. The prism 300 may be moved in a direction parallel to the upper surface of the second temporary substrate 820 while the fourth preliminary adhesive layer 234 is in contact with the upper surface of the second temporary substrate 820. Moving the prism 300 may be repeated one to three times. Accordingly, some of the fourth preliminary adhesive layer 234 remains on the upper surface of the second temporary substrate 820, so that the thickness of the fourth preliminary adhesive layer 234 on the first surface 300b of the prism 300 may decrease. For example, the fourth preliminary adhesive layer 234 may have a thickness of 0.001 μm to less than 1 μm. The first surface 300b of the fourth preliminary adhesive layer 234 may be further flattened by the contact with the second temporary substrate 820.

Figure 8:
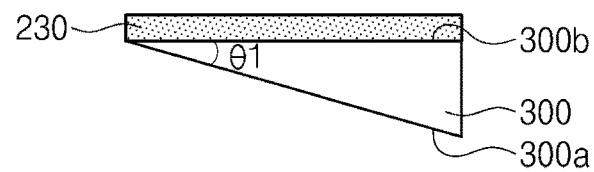

Referring to FIG. 8, the prism 300 may be turned upside down so that the fourth preliminary adhesive layer 234 faces upward. The curing process may be performed on the fourth preliminary adhesive layer 234 to form a prism adhesive layer 230. The curing process of the fourth preliminary adhesive layer 234 may be performed in the same way of curing the first preliminary adhesive layer of FIG. 2. For example, the curing process of the fourth preliminary adhesive layer 234 may include a first process performed at a first temperature, a second process performed at a second temperature, and a third process performed at a third temperature. The first, second, and third processes may be performed consecutively. The second temperature may be higher than the first temperature and the third temperature may be higher than the second temperature. For example, the first temperature may be 120° C., the second temperature may be 250° C., and the third temperature may be 400° C. After the third process, the first adhesive layer 211 may be provided at room temperature (about 25° C.). The polyamic acid in the fourth preliminary adhesive layer 234 may be cured by the curing process to form a prism adhesive layer 230 including a polyimide. The prism adhesive layer 230 may cover the first surface 300b of the prism 300 and have a thickness of 0.001 μm to less than 1 μm. The prism adhesive layer 230 may include a polyimide. The polyimide included in the prism adhesive layer 230 may be the same as the polyimide included in the first adhesive layer 211 and the second adhesive layers 212 described in FIG. 4.

Figure 9:
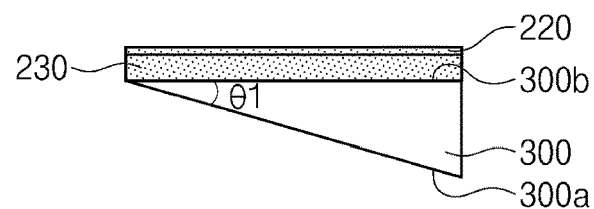

Referring to FIG. 9, a polyamic acid layer 220 may be formed on at least one of the prism adhesive layer 230 and the second adhesive layers 212. For example, the polyamic acid layer 220 may be formed to cover the prism adhesive layer 230. The polyamic acid layer 220 may be formed by a coating process using the adhesive from the inventive concept. As the speed of the coating process increases, the thickness of the polyamic acid layer 220 may decrease. According to embodiments, the coating process may be carried out for 60 seconds at a high rotational rate. The coating process may be performed at a very high speed so that the polyamic acid layer 220 may be formed thin in thickness.

Figure 10:
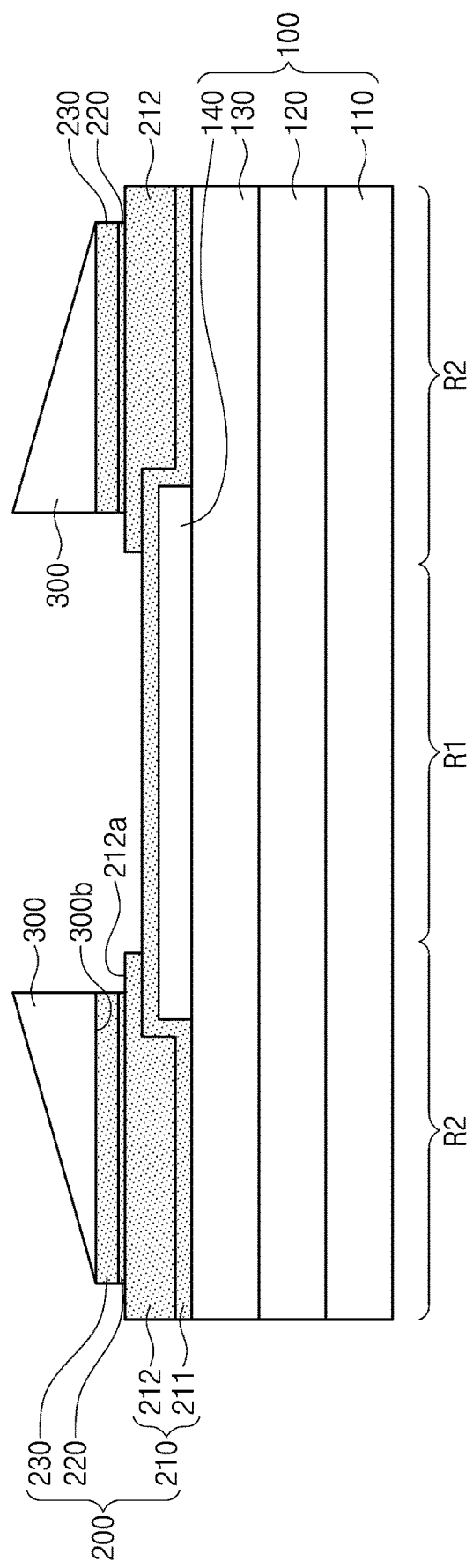
Figure 11:
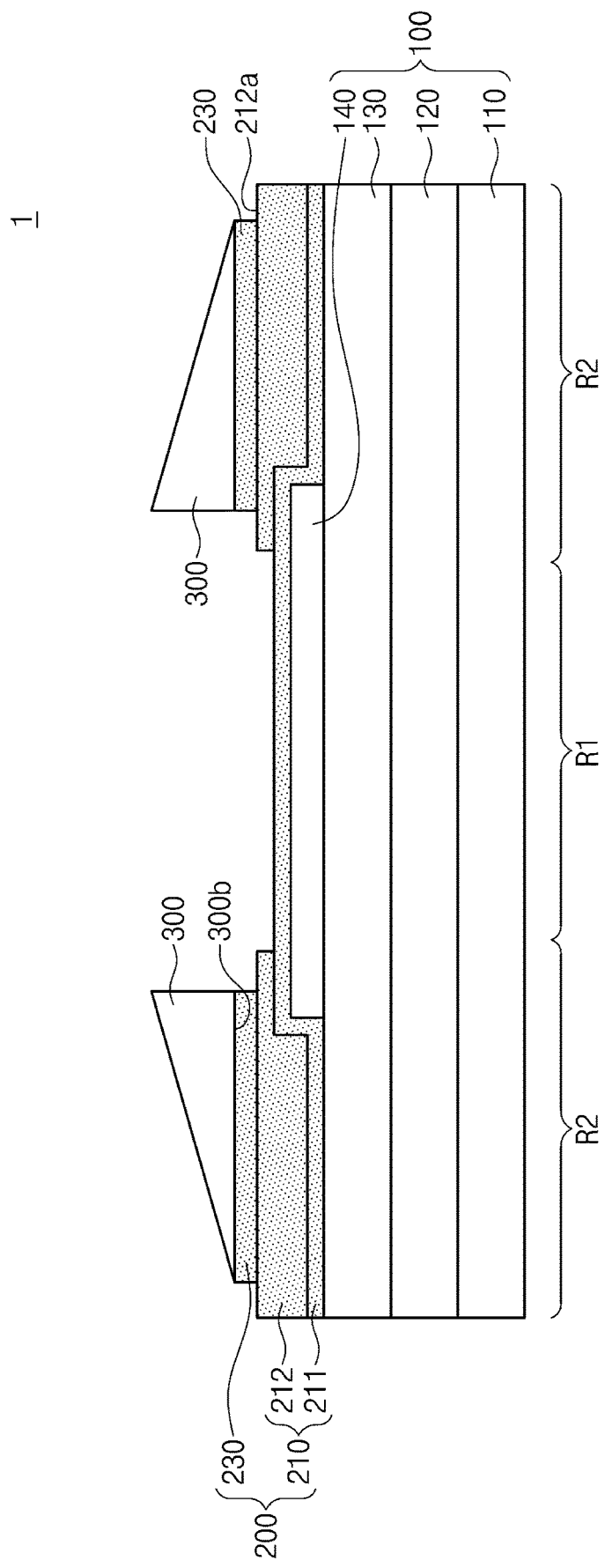

Referring to FIGS. 10 and 11, the substrate structure 100 on which the first adhesive layer 211 and the second adhesive layers 212 are formed may be prepared, and the prism 300 on which the prism adhesive layer 230 and the polyamic acid layer 220 are formed may be prepared. The substrate structure 100, the first adhesive layer 211, and the second adhesive layers 212 may be the same as those described in FIGS. 1 to 4. The prism adhesive layer 230 may be formed as shown in FIGS. 5 to 8, and the polyamic acid layer 220 may be prepared as shown in FIG. 9.

According to embodiments, the prism 300 may be provided in one pair, and the prism adhesive layers 230 may be provided on the first surfaces 300b of the prisms 300, respectively. The prisms 300 may be disposed at positions vertically overlapping with the corresponding second adhesive layers 212. The number of the prisms 300 and the number of the second adhesive layers 212 are not limited as shown. Hereinafter, a single prism 300, a single prism adhesive layer 230, and a single second adhesive layer 212 will be described in the following description of FIGS. 10 and 11 for simplicity.

The prism 300 may be disposed on the substrate structure 100 such that the prism adhesive layers 230 face the corresponding second adhesive layers 212. In this case, the polyamic acid layer 220 may be interposed between the prism adhesive layer 230 and the second adhesive layer 212. The polyamic acid layer 220 may be in physical contact with the upper surface of the second adhesive layer 212. Specifically, the polyamic acid layer 220 may contact the active functional groups on the upper surface 212a of the second adhesive layer 212. The polyamic acid layer 220 may include a polyamic acid solution and may be in a liquid state.

Bonding the adhesive layer 210 to the prism adhesive layer 230 may be performed by applying pressure on the prism 300 and the substrate structure 100. As the time between contacting the polyamic acid layer 220 with the upper surface of the second adhesive layer 212 and applying pressure decreases, the material of the polyamic acid layer 220 may prevent from permeating into the prism adhesive layer 230 or the second adhesive layer 212. According to embodiments, right after the polyamic acid layer 220 is in contact, pressure may be applied to the prism 300 and the substrate structure 100. Accordingly, excessive permeation of the material of the polyamic acid layer 220 into the prism adhesive layer 230 or the second adhesive layer 212 may be prevented.

Applying pressure may be performed for 10 minutes to 60 minutes at 1 MPa to 10 MPa. As a pressure of 10 MPa or less is applied, physical damage of the first adhesive layer 211, the second adhesive layer 212, or the prism adhesive layer 230 may be prevented. The physical damage may include fracture. By applying the pressure, secondary forces may be formed among the active functional groups of the prism adhesive layer 230, the polyamic acid layer 220, and the second adhesive layer 212. The prism adhesive layer 230 may be bonded to the second adhesive layer 212 by the secondary forces. That is, bonding the prism adhesive layer 230 to the adhesive layer 210 may include forming intermolecular van der Waals forces, an electric dipole bond and/or an induced dipole bond among a polyamic acid included in the polyamic acid layer 220 and the polyimide molecule included in the prism adhesive layer 230, and the active functional groups.

As another example, the active functional groups of the polyamic acid, the prism adhesive layer 230, and the second adhesive layer 212 included in the polyamic acid layer 220 may be chemically reacted by applying pressure. Accordingly, the prism adhesive layer 230 may be bonded to the adhesive layer 210. In this case, bonding the prism adhesive layer 230 to the adhesive layer 210 may include forming ionic, covalent, and/or metal bonds between the polyamic acid layer 220, the polyimide molecules of the prism adhesive layer 230, and the active functional groups.

Some of the polyamic acid layer 220 may be used to form adhesion between the prism adhesive layer 230 and the second adhesive layer 212. The polyamic acid layer 220 may include the same material (e.g. the same polyamic acid) as the adhesive used in preparing the second adhesive layers 212 and the adhesive used in preparing the prism adhesive layer 230. Accordingly, re-bonding between the active functional group of the second adhesive layer 212 and the polyamic acid included in the polyamic acid layer 220, and the bonding between the active functional group of the adhesive layer 212 and the prism adhesive layer 230 may be well formed.

Since the polyamic acid layer 220 is in a liquid state, most of the polyamic acid layer 220 may be released to the side of the prism 300 by applying the pressure. The portion of the released polyamic acid layer 220 may be a portion that is not used to form a bond between the prism adhesive layer 230 and the active functional group of the second adhesive layer 212. The released polyamic acid layer 220 may be removed. Accordingly, after the adhesion between the prism adhesive layer 230 and the second adhesive layer 212 is completed as shown in FIG. 11, the polyamic acid layer 220 may not remain between the prism adhesive layer 230 and the second adhesive layer 212.

The prism adhesive layer 230 may be bonded to the adhesive layer 210 to form an adhesive structure 200. The adhesive structure 200 may be interposed between the prism 300 and the substrate structure 100. The adhesive structure 200 may include the first adhesive layer 211, the second adhesive layer 212 and the prism adhesive layer 230, and the prism adhesive layer 230 may be in a state bonded to the second adhesive layer 212.

When applying pressure is performed at a temperature of less than 80° C., it may be difficult to sufficiently generate the secondary bonding force of the polyamic acid layer 220, the prism adhesive layer 230 and the second adhesive layer 212. When an adhesive force between the prism adhesive layer 230 and the second adhesive layer 212 is formed at the curing temperature (e.g. 200-350° C.) of the polyamic acid layer 220, voids or bubbles may be generated in the polyamic acid layer 220. According to embodiments, the applying of the pressure may be performed at a temperature of 80-150° C. In detail, applying pressure may be performed at a temperature of 120° C. Accordingly, the formation of voids or bubbles between the second adhesive layer 212 and the prism adhesive layer 230 may be prevented. Bonding forces between the second adhesive layer 212 and the prism adhesive layer 230 may be improved. In the most sophisticated way, the polyamic acid layer 220 is fully released to the side while applying pressure, and when the second adhesive layer 212 and the prism adhesive layer 230 are bonded together by the secondary forces at a temperature of 120° C., not only voids or bubbles may not be formed but also a favorable bonding force may be exhibited.

According to embodiments, as the first adhesive layer 211 is provided, a contact area between the adhesive structure 200 and the substrate structure 100 may increase. Accordingly, the second adhesive layers 212 may be more firmly bonded to the substrate structure 100.

An optical module 1 may be prepared by the manufacturing example described above. The optical module 1 may include the substrate structure 100, the adhesive structure 200, and the prism 300.

Figure 12:
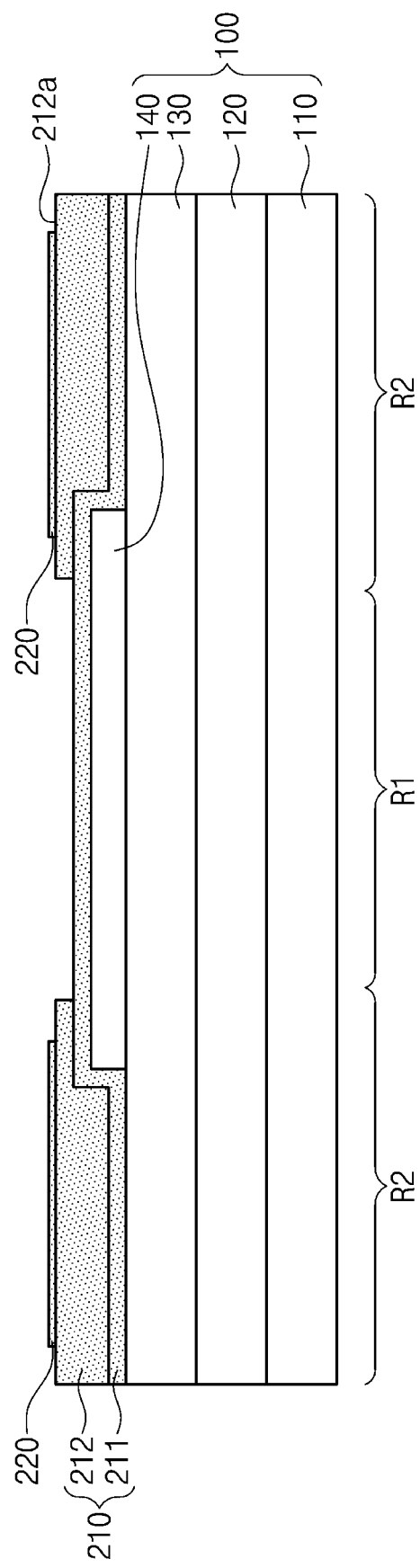
FIG. 12 is a flowchart showing a method for preparing an adhesive structure and an optical module according to other embodiments.

FIG. 12 is a drawing illustrating a method of forming an adhesive structure and an optical module according to other embodiments. Duplicate content as described above will be omitted.

Referring to FIG. 12, polyamic acid layers 220 may be formed on the upper surfaces of the second adhesive layers 212, respectively. The method and material for forming the polyamic acid layers 220 are the same as those described above in FIG. 9. The polyamic acid layers 220 may be in physical contact with the upper surfaces of the second adhesive layers 212, respectively. Specifically, the polyamic acid layers 220 may contact the active functional groups on the upper surfaces 212a of the second adhesive layers 212. Each of the polyamic acid layers 220 may include a polyamic acid solution and be in a liquid state.

Referring back to FIG. 10, the prism 300 having the prism adhesive layer 230 may be prepared. For example, the prism adhesive layer 230 may be prepared as shown in FIGS. 4 to 8, and the polyamic acid layer 220 described in FIG. may not be formed on the lower surface of the prism adhesive layer 230. The prism 300 on which the prism adhesive layer 230 is formed may be prepared in one pair.

The prisms 300 may be disposed on the substrate structure 100 such that the prism adhesive layers 230 face the second adhesive layers 212, respectively. The polyamic acid layers 220 may be interposed between the prism adhesive layers 230 and the second adhesive layers 212, respectively.

As another example, the prism 300 having the polyamic acid layer 220 and the prism adhesive layer 230 shown in FIG. 9 may be prepared. The prism 300 may be prepared in plurality. The prisms 300 may be disposed on the substrate structure 100 such that the polyamic acid layers 220 on the first surfaces 300b of the prisms 300 are in contact with the polyamic acid layers 220 on the upper surface of the substrate structure 100 of FIG. 12, respectively.

Referring to FIG. 11, pressure may be applied to the prisms 300 and the substrate structure 100 under the same conditions as described above to form the adhesive structure 200. The prisms 300 may be bonded to the substrate structure 100 through the adhesive structure 200. The optical module 1 may be prepared by the manufacturing example described above.

Figure 13A:
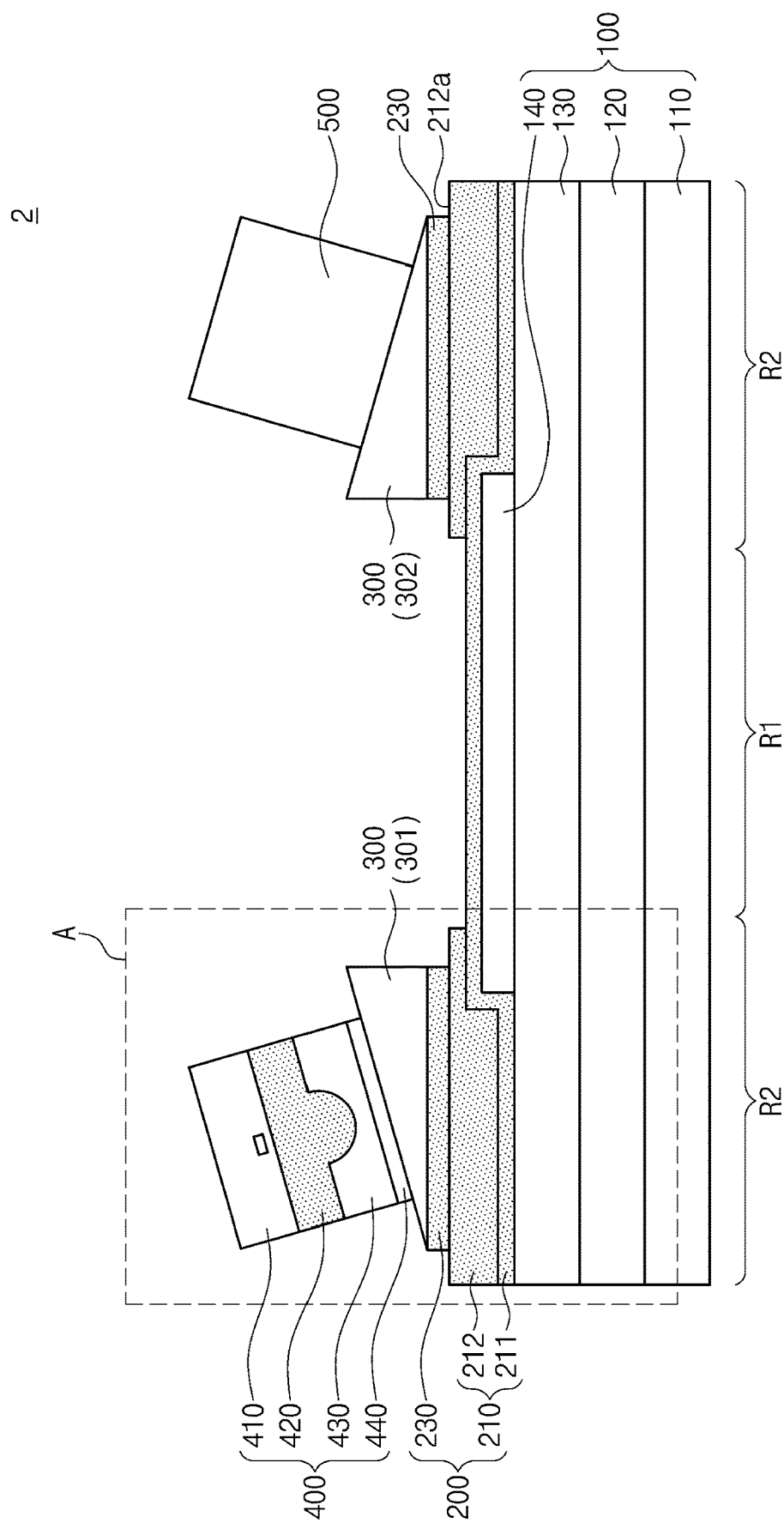
FIG. 13A is a cross-sectional view of an optical module according to other embodiments.
Figure 13B:
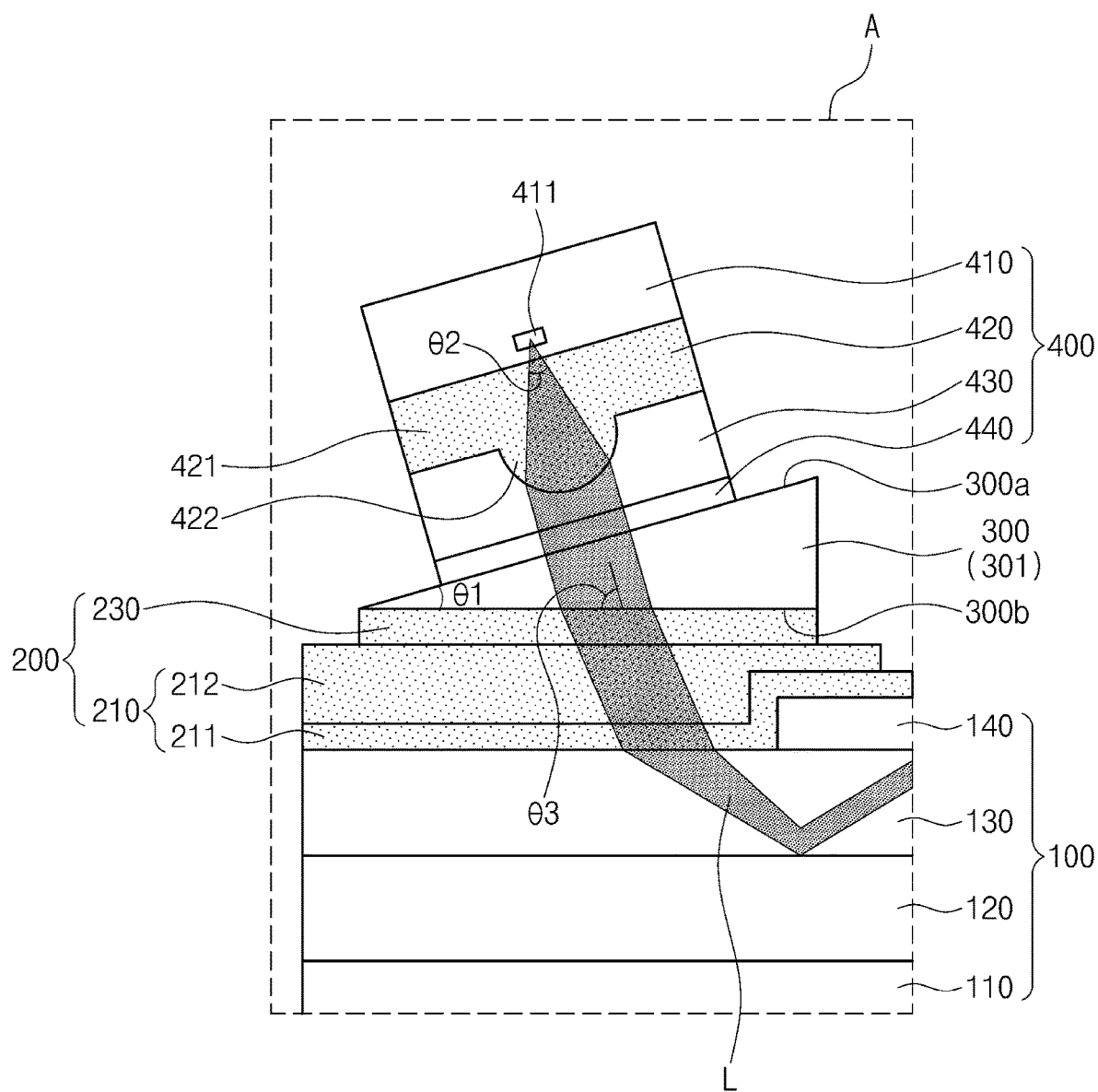
FIG. 13B is an enlarged view of area A shown in FIG. 13A.

FIG. 13A is a cross-sectional view illustrating an optical module according to other embodiments. FIG. 13B is an enlarged view of region A of FIG. 13A. Duplicate content as described above will be omitted.

FIGS. 13A and 13B, the optical module 2 may include the substrate structure 100, the adhesive structure 200, the prisms 300, an optical device 400, and a photodetector device 500. The substrate structure 100 may include the substrate 110, the lower clad layer 120, the optical waveguide layer 130, and the upper clad layer 140 which are stacked. The adhesive structure 200 may include the adhesive layer 210 and the prism adhesive layers 230, and the adhesive layer 210 may include the first adhesive layer 211 and the second adhesive layers 212. The prisms 300 may include a first prism 301 and a second prism 302 spaced apart from each other.

The optical element 400 may be disposed on the first prism 301. The optical device 400 may include a light generating unit 410, a lens 420, an adhesive pattern 430, and a light transmitting unit 440. The light generating unit 410 may generate and emit the laser light L. The light generating unit 410 may be a vertical cavity surface emitting laser (VCSEL) or a laser diode. As shown in FIG. 13B, the laser light L emitted from the light generating unit 410 may have a second angle $\theta 2$ as a radiation angle. For example, the second angle $\theta 2$ may be 20 to 40 degrees. The light generator unit 410 may include an opening 411, and the laser light L may be emitted from the opening 411.

The lens 420 may be provided on a lower surface of the light generating unit 410. The lens 420 may include a base portion 421 and a protrusion 422. The base portion 421 may have the form of a flat plate. The protrusion 422 may have the form of a hemisphere. The base portion 421 may be provided on the light generating unit 410, and the protrusion 422 may protrude from the base portion 421 toward the prism 300. The lens 420 may have a refractive index of 1.65 to 2.5. The lens 420 may include at least one of SiC, GaN, $Si_3N_4$, TiN, $LiNbO_3$, $TiO_2$, ZnSe, and Polyimide.

The adhesive pattern 430 may be provided on the lower surface of the lens 420. The adhesive pattern 430 may cover the lens 420. In other words, the adhesive pattern 430 may cover the lower surface of the base portion 421 of the lens 420 and the lower surface of the protrusion 422 of the lens 420. The adhesive pattern 430 may have a refractive index of 1.3 to 1.55. The adhesive pattern 430 may include an optical adhesive.

The light transmitting unit 440 may be provided on the lower surface of the adhesive pattern 430. The light transmitting unit 440 may include glass or quarts. The light transmitting unit 440 is illustrated as being spaced apart from the protrusion 422 of the lens 420 by the adhesive pattern 430, but may not be limited thereto. For example, the light transmitting unit 440 may be in contact with the protrusion 422 of the lens 420.

For the operation of the optical module 2 according to an embodiment of the inventive concept, as shown in FIG. 13B, the laser light L generated by the light generating unit 410 of the optical device 400 may pass through the lens 420 and the adhesive pattern 430. While passing through the lens 420 and the adhesive pattern 430, the radiation angle of the laser light L may be reduced. Accordingly, the laser light L passing through the light transmitting unit 440 may be parallel light. In other words, the radiation angle of the laser light L passing through the light transmitting unit 440 may be 0 degrees.

The laser light L that has passed through the light transmitting unit 440 may be vertically incident to the inclined surface 300a of the prism 300 to pass through the prism 300. The laser light L passing through the prism 300 may form a third angle $\theta 3$ with the first surface 300b of the prism 300. The third angle $\theta 3$ may correspond to the inclination angle of the prism 300. In other words, the sum of the first angle $\theta 1$ and the third angle $\theta 3$ may be 90 degrees.

The laser light L that has passed through the prism 300 may pass through the adhesive structure 200 and be incident to the optical waveguide layer 130. The laser light L incident to the optical waveguide layer 130 may be reflected by the lower clad layer 120 and the upper clad layer 140, and may travel along the optical waveguide layer 130.

If the light passing through the light transmitting unit 440 of the optical device 400 is not parallel light, the laser light L may not pass through the prism 300 and the adhesive structure 200 to be focused on the optical waveguide layer 130. For example, when the radiation angle of the laser light L passing through the light transmitting unit 440 is 2 degrees or more, a substantial portion of the laser light L may not be focused on the optical waveguide layer 130. According to the inventive concept, the laser light L emitted from the optical device 400 may be parallel light, so that the laser light L may be focused on the optical waveguide layer 130.

As shown in FIG. 13A, a first wavelength light may be emitted from the optical device 400. The first wavelength light may be the laser light L described in FIG. 13B. The first wavelength light may pass through the adhesive structure 200 and be incident to the optical waveguide layer 130, and may travel in the optical waveguide layer 130. The first wavelength light may be transmitted below the second prism 302 through the optical waveguide layer 130. The first wavelength light may pass through the second prism 302. The photodetector device 500 may be provided on the second prism 302. The light passing through the second prism 302 may be transmitted to the photodetector device 500. The photodetector device 500 may detect the first wavelength light.

Although not shown, a first filter may be further provided between the adhesive structure 200 and the first prism 301. The first filter may transmit the first wavelength light. The first filter may not transmit light having a wavelength different from the first wavelength. A second filter may be further provided between the adhesive structure 200 and the photodetector device 500. The second filter may transmit the first wavelength light. The second filter may not transmit light having a wavelength different from the first wavelength.

Hereinafter, with reference to a comparative example and an experimental example of the inventive concept, the preparation and evaluation results of the adhesive structure and the preparation and evaluation results of the optical module including the adhesive structure will be described.

1. Comparative Example

As described above, a substrate structure, an adhesive structure, and a prism are prepared. However, applying pressure to the substrate structure and the prism is performed at 300-400° C. Thereafter, an optical device is placed on the prism. Current is applied to the optical device to generate light in the optical device. The light output from the lower surface of the substrate structure is observed.

2. Experimental Example

As described above, a substrate structure, an adhesive structure, and a prism are prepared. Applying pressure to the substrate structure and prism is performed at 120° C. Thereafter, an optical device is placed on the prism. Current is applied to the optical device to generate light in the optical device. The light output from the lower surface of the substrate structure is observed.

Table 1 shows the measurement results of the material and the electrical conductivity contained in the film of comparative examples and experimental examples.

TABLE 1

|  | Voids or Bubbles | Optical signal connection success rate |
|---|---|---|
| Comparative Example | — | Low |
| Experimental Example | — | High |

Referring to Table 1, the experimental example was observed to have a higher optical signal connection success rate than the comparative example. It was observed that voids and bubbles were not generated in the adhesive structure of the experimental example.

As described above, according to the present disclosure, an adhesive structure may have improved adhesive strength, high-transparency, a high glass transition temperature, and solvent resistance. The adhesive structure may be readily applied to a process for manufacturing a semiconductor device or an optical module The foregoing detailed description is not intended to limit the inventive concept to the disclosed embodiments, and may be used in various other combinations, modifications, and environments without departing from the spirit of the inventive concept. The attached claims should be construed to include other embodiments.

What is claimed is:

1. A method for manufacturing an optical module, the method comprising:
preparing a substrate structure;
forming a first thermoset polyimide layer by applying a first polyamic acid solution to an upper surface of the substrate structure, wherein the first polyamic acid solution is prepared to be a first thermoset polyimide;
curing the first thermoset polyimide layer;
forming active functional groups including dangling bonds on an upper surface of the first thermoset polyimide layer by performing a planarization process including grinding and/or polishing;
forming and curing a second thermoset polyimide layer to a lower surface of a prism,
applying a second polyamic acid solution on at least an upper surface of the planarized first thermoset polyimide layer and a lower surface of the second thermoset polyimide layer;
disposing the prism on the substrate structure such that the planarized first thermoset polyimide layer contacts the second thermoset polyimide layer and the second polyamic acid solution; and
bonding the second thermoset polyimide layer to the planarized first thermoset polyimide layer by applying pressure to the prism and the substrate structure,
wherein the active functional groups have an adhesive property with the second thermoset polyimide layer.

2. The method of claim 1, wherein the applying of pressure to the prism and the substrate structure is performed at a temperature lower than a curing temperature of the second polyamic acid solution.

3. The method of claim 2, wherein the applying of pressure to the prism and the substrate structure is performed at a temperature ranging from 80° C. to 150° C.

4. The method of claim 1, wherein the second polyamic acid solution contains a same material as the first polyamic acid solution to be a second thermoset polyimide.

5. The method of claim 1, wherein the bonding of the second thermoset polyimide layer to the planarized first thermoset polyimide layer comprises forming an intermolecular van der Waals force, an electric dipole bond or an induced dipole bond among a polyamic acid included in the second thermoset polyimide layer and the active functional groups on the planarized first thermoset polyimide layer.

6. The method of claim 1, wherein the bonding of the second thermoset polyimide layer to the planarized first thermoset polyimide layer comprises forming an ionic bond, a covalent bond or a metallic bond among a polyamic acid included in the second thermoset polyimide layer and the active functional groups on the planarized first thermoset polyimide layer.

7. The method of claim 1, wherein the applying of the first polyamic acid solution comprises spin-coating the first polyamic acid solution on the upper surface of the substrate structure to form a first preliminary adhesive layer.

8. The method of claim 7, wherein the forming the first thermoset polyimide layer comprises:
curing the first preliminary adhesive layer to form a first adhesive layer;
forming a second preliminary adhesive layer on the first adhesive layer; and carrying out a curing process on the second preliminary adhesive layer to form a second adhesive layer, wherein the second preliminary adhesive layer includes a polyamic acid, and the second adhesive layer includes a polyimide.

\* \* \* \* \*